United States Patent [19]

Hawkins

[11] Patent Number: 4,543,030
[45] Date of Patent: Sep. 24, 1985

[54] FIFTH WHEEL WRECKER HOIST

[76] Inventor: Wallace H. Hawkins, P.O. Box 3726, Greenville, S.C. 29608

[21] Appl. No.: 567,362

[22] Filed: Dec. 30, 1983

[51] Int. Cl.$^4$ ................................................ B60P 3/12
[52] U.S. Cl. ..................................... 414/563; 212/261; 212/264; 280/402; 414/920
[58] Field of Search ................ 414/563, 920; 280/402; 212/255, 261, 264, 230, 231, 238

[56] References Cited

U.S. PATENT DOCUMENTS

| | | | |
|---|---|---|---|
| 2,481,223 | 9/1949 | Johnson | 414/563 |
| 4,152,006 | 5/1979 | Dunlap | 414/563 X |
| 4,451,193 | 5/1984 | Cannon et al. | 414/563 |

*Primary Examiner*—Robert G. Sheridan
*Attorney, Agent, or Firm*—Bailey & Hardaway

[57] ABSTRACT

A fifth wheel wrecker hoist is illustrated having apparatus which affords longitudinal adjustment between the fifth wheel and the boom which includes a longitudinal guide having a plurality of spaced openings for use in connection with a support carried by the fifth wheel having a retractable plunger for engaging one of the openings respectively for positioning the boom in a desired adjusted position.

1 Claim, 6 Drawing Figures

Fig. 5-A

FIFTH WHEEL WRECKER HOIST

BACKGROUND OF THE INVENTION

Fifth wheel wrecker hoist have been provided having a boom pivotally carried by the fifth wheel of a tractor and extending rearwardly thereof so as to be operated by cylinders carried by the frame of the tractor intermediate the ends of the boom. It was found necessary to provide adjustable means for securing the cylinders and the boom lifting or carrying sling with respect to the frame of the tractor which carries the fifth wheel. Depending upon the length of the frame it is desirable to facilitate adjustment between the boom and the fifth wheel so as to provide a pivotal connection at such a point that the boom will extend a desired distance rearwardly of the frame for supporting a load, such as a vehicle being towed by the tractor.

It is an important object of this invention that an adjustment means be provided for this purpose which is capable of ready adjustment but which will retain the boom positively in adjusted position during operation of the hoist.

SUMMARY OF THE INVENTION

It has been found that means may be provided for affording a longitudinal adjustment between the fifth wheel and the boom of a wrecker hoist wherein a longitudinal guide carried by the boom has a plurality of spaced openings cooperatively engaged by a spring biased plunger mounted upon a support carried by the fifth wheel, and which includes stop means for retaining the plunger in retracted position during longitudinal adjustment of the boom.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

A fifth wheel wrecker hoist having a boom extending rearwardly from a tractor is illustrated. A longitudinal frame extends rearwardly of the fifth wheel which is pivotally carried thereon. Fluid operated cylinders are carried on each side of an intermediate portion of the boom being extensible for raising a sling carrying the boom. Means are provided for securing the cylinders and boom to the longitudinal frame. Means affording a longitudinal adjustment between the fifth wheel and the boom include a longitudinal guide A having a plurality of spaced openings carred by the boom on an upper surface thereof. A support B is fixed with respect to the fifth wheel and has a portion in superposed relation to the spaced openings. A plunger C is carried by the support in vertical alignment with respective spaced openings. Spring means D is carried by the support normally urging the plunger downwardly. Stop means E maintains the plunger in retracted position during longitudinal adjustment of the boom with respect to said fifth wheel releasable to permit the plunger to be received in locking engagement with the respective openings maintaining the boom in longitudinally adjusted position.

Figure 1:
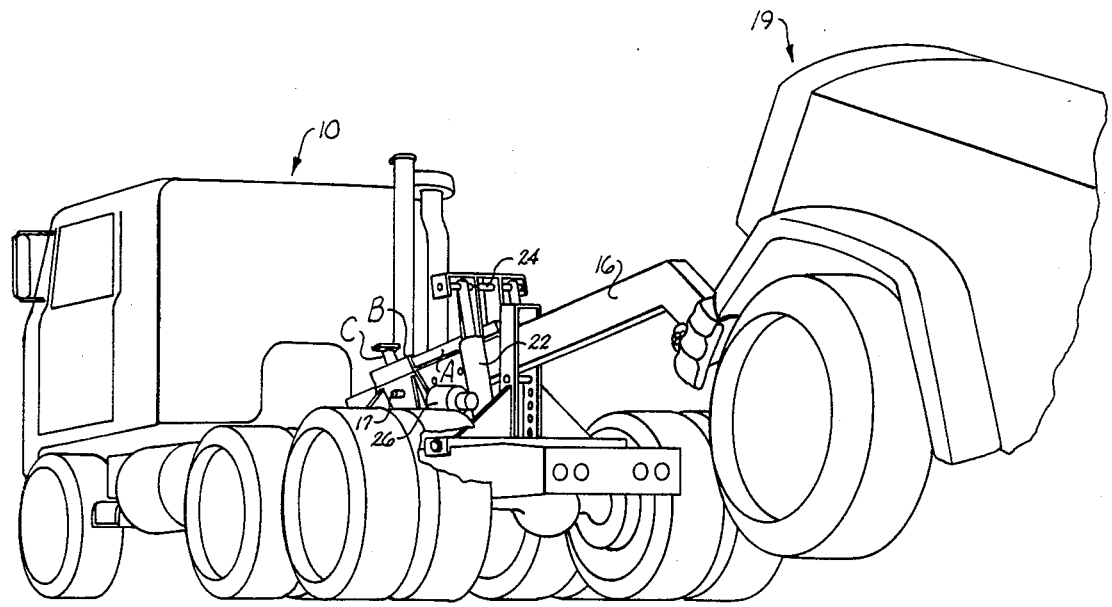
FIG. 1 is a perspective view illustrating a fifth wheel hoist having means for affording a longitudinal adjustment between the fifth wheel and the boom constructed in accordance with the invention.
Figure 2:
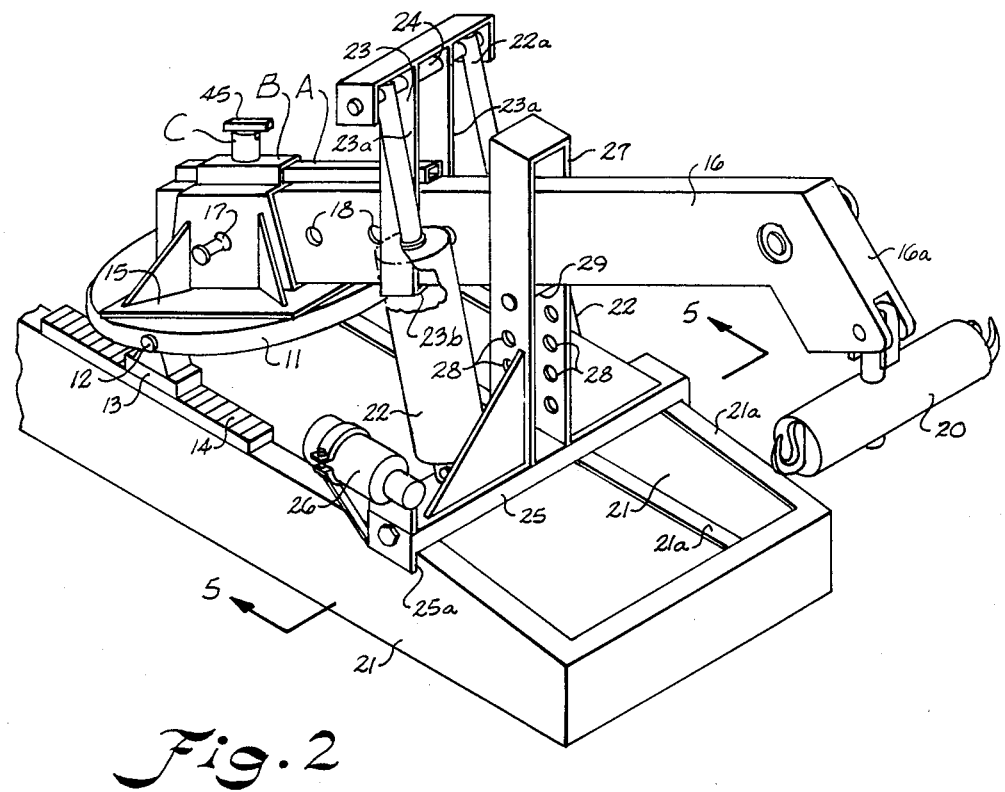
FIG. 2 is an enlarged perspective view further illustrating the means affording such longitudinal adjustment.

The drawings illustrate a tractor broadly designated at 10 in FIG. 1 having a fifth wheel 11 which is pivotally carried as at 12 upon longitudinally adjustable supports 13 as illustrated in FIG. 2. The supports 13 are carried upon the stand 14 which receives them at desired longitudinal positions. A support 15 is suitably fixed by a pin not shown to the fifth wheel 11. A boom 16 is secured in an adjusted position by a pin 17 received by one of the longitudinally spaced holes 18 as illustrated in FIG. 2. The boom 16 in FIG. 1 is illustrated as supporting a vehicle broadly designated at 19 upon a pivoted fastening member 20 (FIG. 2) carried by a depending portion 16a carried at the free end of the boom. A longitudinal frame extends rearwardly of the fifth wheel which is pivoted carried thereon as described above, and includes a pair of sides 21 having inwardly extending legs 21a.

Fluid operated cylinders 22 are carried on each side of an intermediate portion of the boom and are extensible for raising a U-shaped sling 23 which supports the boom and which includes a pair of spaced legs 23a and a lower bridging member 23b extending between the legs supporting the boom. The upper ends of the legs 23a are pivotally carried upon a rod 24 to which the piston rods 22a of the cylinders also have pivotal connection. The lower ends of the cylinders are carried upon a base plate 25 which has longitudinally adjustably connection with the sides 21 of the frame. A motor 26 is also carried by the longitudinally adjustable base member 25 as is a U-shaped housing 27 which carries a vertical row of spaced openings 28 on each side of the boom for receiving a pin 29 for supporting the boom 16 in a desired elevated position.

Figure 5:
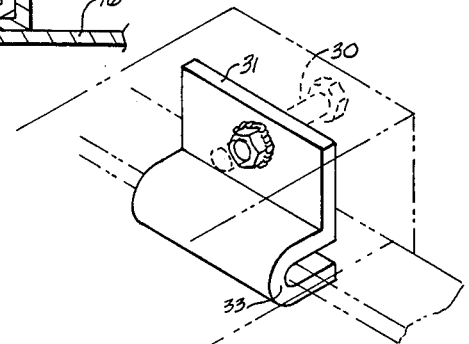
FIG. 5 is a transverse sectional elevation taken on the line 5—5 in FIG. 2 illustrating means for adjustably positioning the support for boom lifting cylinders and related structure, FIG. 5-A is an enlarged perspective view further illustrating the bracket for effecting adjustment of the structure illustrated in FIG. 5.
Figure 5:
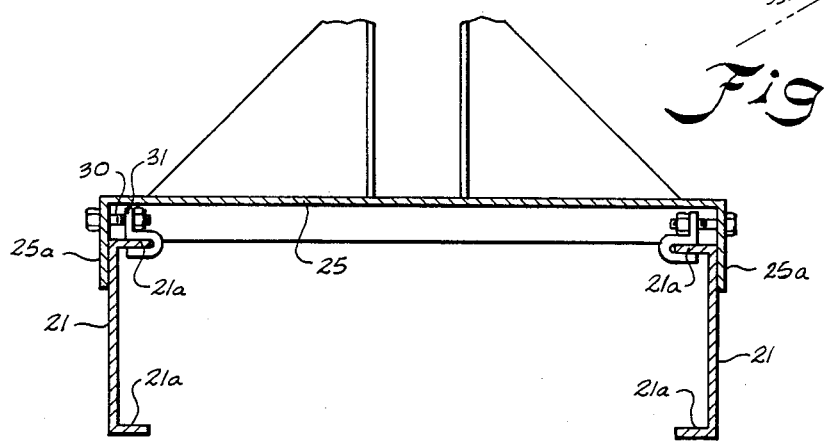

FIG. 5 and 5-A illustrate an adjustable fastening for securing the base 25 which carries the upright U-shaped member 27 in a desired longitudinal adjusted position on the sides 21 of the frame. A threaded bolt 30 (FIGS. 2 and 5) may be tightened between a vertical web 31 of a bracket and a depending flange 25a of the base 25. The bracket has a U-shaped portion 33 depending from the vertical web 31 for embracing the respective upper side flanges 21a.

Means for affording a longitudinal adjustment between the fifth wheel and the boom include a longitudinal guide A in the form of a tubular member which is received within the support B which includes an upper plate or support 34 together with a pair of depending legs 35 which have fixed connection with respect to the fifth wheel through the base support 15.

Figure 4:
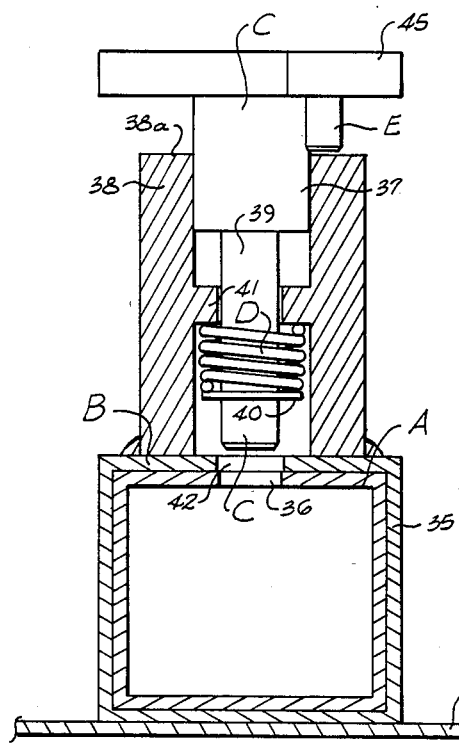
FIG. 4 is an enlarged sectional elevation taken on the line 4—4 in FIG. 3.

Referring more particularly to FIG. 4, it will be noted that the plunger C is carried by the support in vertical alignment with respected spaced openings 36 carried in the longitudinal guide A. The plunger has an enlarged upper portion 37 carried within the vertical housing 38 together with a spring means D which is compressed upon the lower reduced portion 39 of the plunger by a retention member 40 beneath an abutment 41 which also acts as a guide for the plunger. As will be observed in FIG. 4, the spaced openings 36 register wihin a complimentary opening 42 within the support B.

Figure 3:
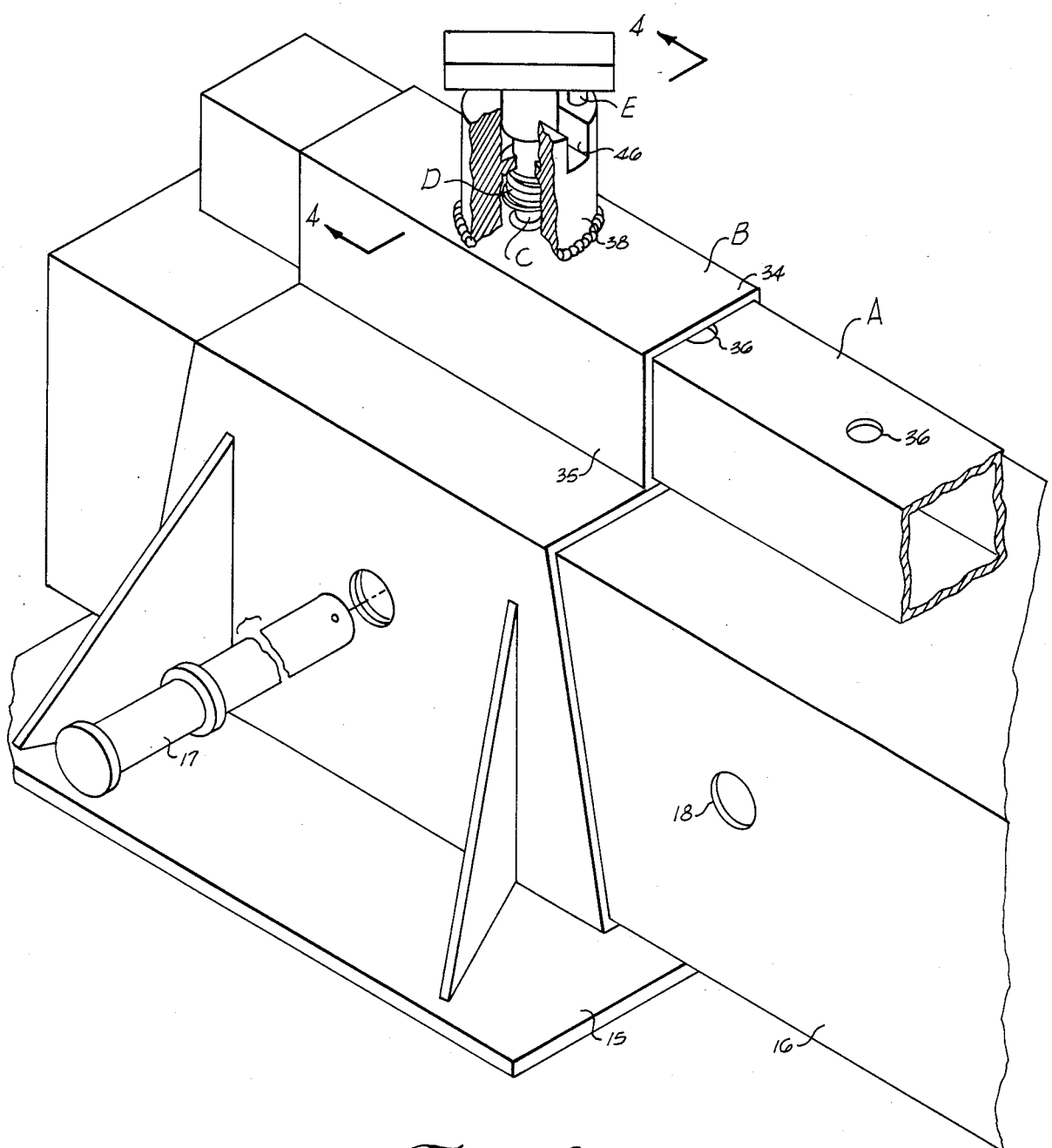
FIG. 3 is an enlarged view illustrating such adjustment with parts broken away for clarity of illustration.

A stop E depends from a handle 45 carried at the upper end of the plunger 37 and may be manipulated through the vertical slot 46 (FIG. 3) in the housing 30a and rests against an upper surface 38a.

While a preferred embodiment of the invention has been described using specific terms, such description is for illustrative purposes only and it is to be understood that changes and variations may be made without departing from the spirit or scope of the following claims.

What is claimed is:

1. For use in a fifth wheel wrecker hoist having a boom extending rearwardly from a tractor having a longitudinal frame extending rearwardly of the fifth wheel pivotally carried thereon, fluid operated cylinders carried on each side of an intermediate portion of said boom being extensible for raising a sling carrying said boom, and means for securing said wrecker hoist to said longitudinal frame, means affording a longitudinal adjustment between said fifth wheel and said boom comprising:

a tubular longitudinal guide having plurality of spaced openings fixed with respect to said boom and carried in longitudinal alignment on an upper surface thereof;

a support fixed with respect to the fifth wheel having a portion in superposed relation to said spaced openings;

a plunger carried by said support in vertical alignment with respective spaced openings;

spring means carried by said support normally urging said plunger downwardly; and a stop means maintaining said plunger in retracted position during longitudinal adjustment of said boom with respect to said fifth wheel releasable to permit said plunger to be received in locking engagement with said respective openings maintaining said boom in longitudinally adjusted position.

* * * * *